No. 708,791.  
Patented Sept. 9, 1902.

M. E. ABRAHAMS.
EGG SEPARATOR.
(Application filed Feb. 21, 1902.)

(No Model.)

Witnesses  
Alfred A. Eicker  
John Rickey

Inventor  
Mary E. Abrahams  
By Higdon & Longan Atty's

UNITED STATES PATENT OFFICE.

MARY E. ABRAHAMS, OF ST. LOUIS, MISSOURI, ASSIGNOR TO MARTHA BELL, OF PORTLAND, OREGON.

EGG-SEPARATOR.

SPECIFICATION forming part of Letters Patent No. 708,791, dated September 9, 1902.

Application filed February 21, 1902. Serial No. 95,123. (No model.)

*To all whom it may concern:*

Be it known that I, MARY E. ABRAHAMS, of the city of St. Louis, State of Missouri, have invented certain new and useful Improvements in Egg-Separators, of which the following is a full, clear, and exact description, reference being had to the accompanying drawings, forming a part hereof.

My object is to construct an improved egg-separator; and my invention consists of the novel features herein shown, described, and claimed.

Figure 1:
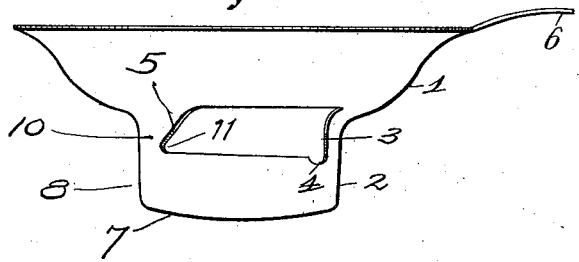
Figure 2:
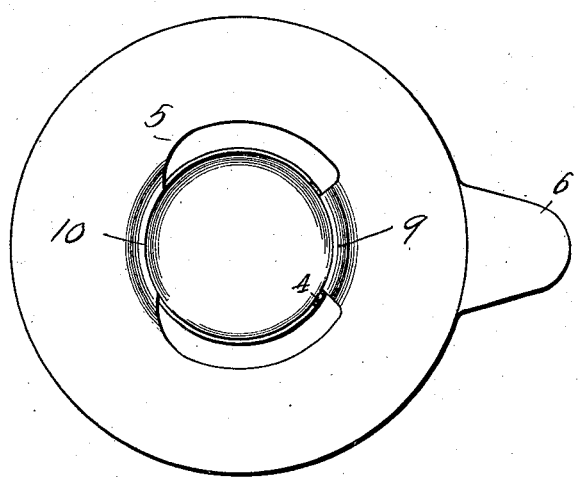
Figure 3:
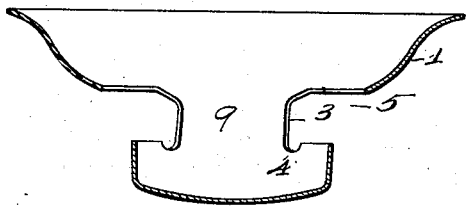

Figure 1 is a side elevation of my improved egg-separator. Fig. 2 is a top plan view. Fig. 3 is a cross-section.

Referring to the drawings in detail, the upper portion 1 of the device is flaring like a soup-plate. The lower portion 2 has a substantially flat bottom 7 and a substantially vertical wall 8, connecting the bottom 7 to the flaring portion 1. The discharge-openings 3 are formed through the upper part of the wall 8 and the lower part of the flaring portion 1, thus leaving the solid portions 9 and 10 connecting the wall 8 to the portion 1. Notches 4 are formed at the ends of the openings 3, on each side of the solid portion 9, and serve as spouts or pour-openings. At the forward ends of the openings 3 the boundaries of the openings are inclined, as indicated by 5, thus making the openings 3 pointed at their lower forward ends, as indicated by 11. A handle 6 extends outwardly from the edge of the portion 1.

When it is desired to use the device, it is placed in a tumbler or cup with the portion 2 depending into the receptacle and the portion 1 resting on the upper edge of the receptacle in a substantially horizontal position. Then the egg is broken and dropped into the separator, and the yolk will pass into the portion 2, and the white will overflow through the discharge-openings 3 into the receptacle. The yolk of the egg is of greater specific gravity than the white and will settle down upon the bottom 7 within the wall 8 and will substantially fill this portion of the device, thus forcing a large part of the white outwardly through the discharge-openings. This operation is greatly facilitated by the notches 4, which serve as pour-holes or spouts. After the white has started to overflow it will continue to run through the notches 4 after it has been drawn below the upper edges of the wall 8, and in this way a large portion of the white will be separated from the yolk. This would not be possible without the notches 4. The solid portion 10 of the wall 8 is of considerable width, as shown in Fig. 2, and when it is desired to remove the yolk the handle is engaged and elevated, thus causing the yolk to pass along this portion 10 out into a suitable receptacle, and in so doing the remainder of the white will pass through the restricted ends 11 of the openings 3, said points 11 being large enough to serve as spouts for the white and not large enough to allow the yolk to obtain a lodgment and break. When the yolk passes along the portion 10 of the wall, the white will be left, except a very thin portion, which adheres to the yolk.

I am aware that egg-separators have been made from having a depression to receive the yolk and having discharge-openings through which the white will overflow; but I am not aware that such a device has been made having notches or pour-holes for draining the white and having a portion along which the yolk could pass out of the receptacle and at the same time drain the last vestige of white through said openings.

I claim—

As an article of manufacture, an egg-separator comprising a flaring upper portion 1; and the lower portion 2 having a substantially flat bottom and a substantially vertical wall connecting the bottom to the flaring portion 1, there being discharge-openings 3 formed through the upper part of the wall 8 and the lower part of the flaring portion 1, thus leaving the solid portions 9 and 10 connecting the wall 8 to the portion 1, and there being notches 4 at the ends of the openings 3 on each side of the solid portion 9 to serve as spouts, and said openings 3 being pointed at their lower forward ends; and the portion 10 being of sufficient width to conduct the yolk of an egg out of the portion 2; substantially as specified.

In testimony whereof I affix my signature in presence of two witnesses.

MARY E. ABRAHAMS.

Witnesses:
M. W. ABRAHAMS,
JOHN C. HIGDON.